3,378,600
NON-TOXIC EPOXY COATING CONTAINING A POLYKETIMINE CURING AGENT

William C. Hodges, Palo Alto, and Harold R. Harlan, Jr., San Bruno, Calif., assignors to Ritter Pfaudler Corporation, a corporation of New York
No Drawing. Filed Apr. 17, 1964, Ser. No. 360,776
12 Claims. (Cl. 260—830)

This invention relates to corrosion-control coatings. More particularly, it relates to compositions suitable for producing impervious, non-toxic linings for food- and/or beverage-containing vessels such as storage tanks, tankcars, tank-trucks, vats and other processing equipment, pipes, marketing containers, cans, and the like used in the preparation, transportation, and/or marketing of liquid (or semi-liquid) ingestible products such as milk, fruit juices, syrups, wine, beer, drugs, and the like. It also relates to a method for making such compositions and coatings. Still more particularly, it relates to epoxy resin compositions suitable for forming such coatings on such vessels, and especially suitable for application to large vessels by spray equipment.

Many problems are involved in the formation of non-toxic, impervious linings on the interior of steel or other metal vessels designed for the storage, processing, or transportation of materials intended for human consumption. Although most vitreous enamels have excellent resistance to acids and alkalis, they are relatively brittle and are expensive to apply even to small vessels. With vessels too large for the ordinary kiln, vitreous coatings become very expensive if not prohibitive.

Thin films for corrosion-control have been applied with carrier solvents (such as the so-called "solvent-epoxy" coatings) which evaporate in the drying of the film. These films are invariably porous, and various pigments and fillers have been tried to improve their resistance to corrosion.

More recently, so-called "solvent-free" coatings formed from reactive resins, such as polyesters and epoxy resins, have been successfully used for forming corrosion-resistant coatings on metal surfaces. With these reactive resins excellent corrosion-resistance can be obtained without the use of pigments. Pigments, however, may be used for coloring or reinforcing purposes in combination with these reactive resins.

Of the two types of non-solvent reactive resin coatings, polyester and epoxy, the epoxy resin type is preferred in many cases, as this type is suitable for use in thinner films while attaining adequate corrosion resistant properties. For example, isopolyesters are commonly applied in coatings 125 to 250 mils thick (usually with the aid of a filler such as chopped glass fibers), while with epoxy resins coating thicknesses of 8 to 30 mils have been recommended.

Although the non-solvent epoxy resin coatings, properly applied, have outstanding impermeability to gases and liquids, virtually no shrinkage, and excellent temperature expansion coefficients, they do present serious difficulties during application. Being addition-reaction products of an epoxy polymer and an amine curing agent which must be exactly proportioned and thoroughly mixed before application, each batch must be used immediately after mixing before the reaction proceeds to a damaging extent. In the usual spray equipment used for applying these viscous materials, their short "pot-life" requires hasty manipulation and creates the serious hazard of the mix setting up prematurely in the spray equipment thereby permanently plugging or fouling the lines, pumps, nozzles, etc.

Recently, some success has been attained in the application of epoxy resin coatings by the use of a new type of curing agent which provides a latent cure of the total mixture at room temperature. This curing agent exhibits a very low order of reactivity in the absence of water, but moisture picked up during and after application of the coating releases a reactive polyamine which functions as a curing agent in the same manner as the coventional amine curing agents. In this manner, a solventless reactive resin coating can be applied with conventional spray equipment without danger of ruining the equipment with prematurely reacted, solidified material. However, these moisture-sensitive curing agents are subject to various objections. Some of these agents require the use of reactive diluents along with the epoxy polymer, which lower the reactivity too greatly, generally reducing the desirable properties. The diluents, furthermore, tend to remain toxic even in the cured film and, therefore, their use is objectionable in food or beverage container linings. Some of the moisture-sensitive curing agents themselves are considered toxic and are not permitted by the U.S. Department of Health, Education, and Welfare, Food and Drug Administration in coating compositions which might come in contact with food, beverages or drugs. Also, epoxy resin coatings cured with these moisture-sensitive agents have invariably wrinkled upon curing unless phenol was added as an accelerator; however, the presence of phenol in a coating composition intended for contact with foods is likewise not permitted by the Food and Drug Administration. Furthermore, some formulations acceptable to the F.D.A. are still unsatisfactory in that they impart objectionable tastes to foods or beverages.

A serious disadvantage encountered with this type of coating composition is the occurrence of the condition known to the painting art as "blushing" whereby an unsatisfactory, cloudy film is obtained critically affecting the acceptability of the work.

The present invention overcomes all the foregoing difficulties by providing an epoxy resin, a novel moisture-sensitive curing agent, and a novel accelerating means to produce a coating which is acceptable to the Food and Drug Administration and which can be sprayed hot upon cold metal surfaces to form, upon curing, a smooth, impervious coating.

We have found that controlled amounts of water, introduced either during application of the coating or immediately prior thereto, will satisfactorily accelerate the reaction of certain mixtures of epoxy resin and moisture-sensitive curing agent to eliminate wrinkling of the cured, non-solvent coating while contributing desirable hardness, toughness and gloss characteristics without the use of the phenol accelerator. By thus eliminating the phenol accelerator commonly employed to prevent wrinkling of this type of epoxy resin coating, this objection to their use for food containers is avoided. For this purpose, sufficient water should be supplied to release all the amine of the curing agent without reliance on atmospheric moisture. With spray equipment commonly used to apply this type of coating to large surfaces, we prefer to introduce the water into the atomizing air, thus producing at the point of application a momentary high humidity environment from which the required amount of water is absorbed by the atomized particles of coating mixture. In such cases, we have found it is generally necessary to supply to the atomizing air from about two to about eight times the amount of water theoretically required to react with the curing agent, the amount varying with the equipment and operating conditions employed. Too little water injected into the atomizing air results in a wrinkled finished coating, while too much water produces spotting of the coating surface (though apparently with little or no internal damage to the coating)—the optimum amount of water being readily determined by simple trial with the equipment and operating conditions to be used in any particular case.

In situations where brush application is desirable because the area to be coated is too small to justify the use of spray equipment (as, for example, in patching chipped areas of previously coated surfaces) we have found that the water can be incorporated directly into the coating mixture just before it is applied to the surface. In such cases we prefer to disperse the required amount of water into the epoxy resin at any convenient time prior to use and then, just prior to use, admix therewith the amine-releasing curing agent. For this type of operation, at least the theoretical amount of water to react with the curing agent is supplied, and may vary from a slight excess to 100% excess or more. We prefer to use about 25% excess in most situations.

In either case, whether the water is introduced into the atomizing air in the spray equipment or incorporated directly into a "brushing" mix, we have found that viscosity control is greatly facilitated by the presence of anhydrous alcohol. This is preferably blended into, and packaged with, the curing agent and the blend then mixed with the resin component when and as needed. It is also believed that the hygroscopicity of the alcohol facilitates the absorption of the water by the mixture and expedites the reaction of the water with the amine-releasing curing agent. For this purpose we may use up to 75 parts by weight of anhydrous ethanol per 100 parts of curing agent, about 25 parts per 100 parts being preferred.

Flow control is also facilitated by the presence of urea formaldehyde which we have found avoids the condition known as "cratering." As with the ethanol, the urea formaldehyde is advantageously blended into and packaged with the curing agent. To assist the blending, the urea formaldehyde is first dissolved in a suitable solvent. For this purpose, we have found a 63% solution of urea formaldehyde in butanol to be satisfactory, and we may use from 10 to 20 parts of the 63% solution per 100 parts curing agent, thereby providing 1.5 to 3 parts pure urea formaldehyde per 100 parts finished coating mixture.

The epoxy polymers and moisture-sensitive curing agent useful in the invention are those which, together, produce non-toxic, impervious films when applied to metal surfaces. As is known in the trade, epoxy polymers are reaction products of polyfunctional halohydrins with polyhydric alcohols and/or phenols to produce glycidyl polyethers, such as glycidyl polyethers of dihydric phenols, with a typical formula:

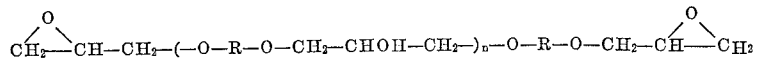

where $n$ is an integer of the series 0, 1, 2, 3, etc. and R in the phenolic type of polymer represents the divalent hydrocarbon radical of a dihydric phenol. Further description of these polymers is contained in Patent 2,500,600 issued Mar. 14, 1950 to Bradley, and in Patent 2,602,785, issued July 8, 1952 to Wiles and Elam. A polymer of this type preferred for use in the invention, manufactured by Shell Chemical Company and sold under the designation Epon 828, has the following approximate properties:

Epon 828:
- Appearance (normal temp.) _____ Viscous, amber liquid.
- Epoxide equivalent (gm./gm. equiv. epoxide) _____ 190 to 210.
- Density (lbs./gal.) _____ 10.3.
- Refractive Index at 20° C. _ 1.573.
- Gardner-Holdt viscosity (solid) _____ $Z_5$–$Z_6$+.
- Equivalent weight _____ 85.
- $n$ (in foregoing formula) _ 1.

The preferred moisture-sensitive curing agent for use with polymer of the foregoing general characteristics is methyl isobutyl ketone polykelimine of diethylenetriamine. (This material is marketed by Shell Chemical Company as "Epon Curing Agent H–1." see British Patent No. 905,725.)

This is a preferred example of an alkyl ketone polyketimine of a polyamine.

We obtain a coating free from "blushing" by reacting or adducting a portion of the epoxy polymer with the curing agent prior to completing the total spray mixture. The adducting may be done at any time prior to use, and the adducted curing agent packaged and stored until required for use, at which time it is mixed with the remainder of the epoxy polymer. As indicated prior, we have found that anhydrous alcohol added to the adduct will give good viscosity control without inhibiting the rapidity of cure. Urea formaldehyde is also preferably added for flow control; it apparently breaks down certain surface tension effects, thereby acting to prevent cratering. Other non-detrimental solvents to assist in fluidizing or blending one or more of the ingredients, pigments of the required color, and the like may be added as desired.

The following examples are offered to demonstrate preferred particles of the invention, but not as limitations to the broader aspects of the invention.

Example 1

A two-component spray mixture is prepared as follows.

| Component A (epoxy polymer and pigment): | Lbs. |
|---|---|
| Epon 828 | 8.18 |
| Pigment: | |
|   TiO$_2$ (Titanium Pigment Corp. "Titanox RA50") | 1.91 |
|   Barytes (C. K. Williams Co. "Sparmite") | 1.92 |
|   Diatomaceous SiO$_2$ (Johns Manville Corp. "Celite 165–S") | 0.75 |
|   Hydrogenated castor oil (Nuodex Products Co. "NuVis 2") | 0.045 |
|   Ethyl alcohol (anhydrous) | 0.09 |
|   Montmorillonite (National Lead Co. "Bentone 27") | 0.09 |
|   Carbon black (G. L. Cabot Co. "Carbolac #2") | 0.06 |
|   Iron oxide (C. K. Williams Co. "Ferrite YLO #1788") | 0.02 |
| | 13.065 |

The montmorillonite is first pre-wetted with the ethyl alcohol, and then combined with one-half of the Epon 828 and all the remaining materials. The mixture is then comminuted over a three-roll mill to a fineness of 6 Hegman scale (usually requiring two or three passes). The remaining Epon 828 is then added with thorough mixing. The mixture is then packaged (e.g. 13.0 lbs. into a two-gallon pail and sealed with lid).

| Component B (adducted curing agent): | Lbs. |
|---|---|
| Methyl isobutyl ketone polyketimine of diethylenetriamine (Shell Chemical Co. "Epon Curing Agent H–1") | 1.960 |
| Epon 828 | 1.197 |
| Urea formaldehyde 63% in butyl alcohol [1] (American Cyanamid Co. "Beetle 216–8") | 0.281 |
| Ethyl alcohol anhydrous | 0.516 |
| | 3.954 |

[1] If a different solution of urea formaldehyde is used (such as 50% or 70% in buantol) the indicated quantity is correspondingly modified.

It will be noted that the ratio of polyketimine to epoxy in component B is about 10:6, and that component A includes about four times as much epoxy as the ketimine in Component B.

The "Epon Curing Agent H–1" is charged to a stainless steel kettle equipped with heating-cooling jacket and stirring paddles, and the Epon 828 is slowly added. The temperature is raised to 120° F. by heating with agitation, after which heating is discontinued and the temperature allowed to rise to 170° F. by exothermic reaction. The mass is then cooled to 160° F. and the temperature held, by cooling, between 160–170° F. until reaction is completed (about 2 to 3 hours). When the reaction mass has cooled to about 120° F., the remaining ingredients, heated to about 140° F., are added and the entire mixture stirred until clear. Since the Epon curing agent is sensitive to moisture, especially during the reaction, care should be exercised to avoid the presence of water. The mixture is then sealed in a one-half gallon container.

Component A and Component B are packaged and stored in separate containers until needed for use. For use, the two components are mixed and charged into the pressure pot of a paint sprayer equipped with means for heating both the liquid and the atomizing air. Another pot of the sprayer, a so-called "catalyst injector" type of pot, is charged with water. The coating mixture and water are simultaneously sprayed onto a metal surface in 2 coats of 6 to 8 mils thickness each, with 6 to 12 hours curing time between coats, and with the following operating conditions during spraying:

Coating mixture:
    Rate ( lbs./min.) _____ 0.35–1.50
    Temp. (° F.) _____ 140–150
Atomizing air:
    Rate (cu. ft./min.) _____ 0.15–0.75
    Temp. (° F.) _____ 170–200
    Pressure (p.s.i.g.) _____ 80–90
Water, rate (grams/min.) _____ [1] 20
Ambient temperature (° F.) _____ 100

[1] The range may be from 15 to 35.

A hard, smooth, impervious, chemical resistant coating free from blush is obtained.

The time required for curing can be reduced by increasing the temperature, ambient humidity, or both during the curing period. For example, the curing of a tank-lining may be accelerated by injecting steam into the tank. Similarly, the curing time to produce a hard, glass-like coating on an article may be reduced to four to eight hours by the application of dry heat sufficient to provide a temperature of 150°–180° F.

Example 2

A two-component brushing mixture for small areas is prepared as follows:

Component A:                                        Grams
    Epon 828 _____ 62.6
    Pigment (similar composition to pigment of
      Example 1) _____ 37.4
    Water _____ 2.5
                                              102.5

The pigment and Epon 828 are mixed as described for Component A of Example 1. The water is then added with stirring until dispersed. The mixture is packaged in a one-quarter-pint can.

Component B: 30.5 grams of a mixture of the same composition (and prepared in the same manner) as Component B of Example 1 is packaged in a one-eighth-pint can.

When ready for use, Component B is thoroughly mixed with Component A and allowed to stand about 30 minutes to one hour, e.g. about 45 minutes. The mixture is then applied with a small brush to a cleaned and roughened area of metal requiring patch-painting, to obtain a coating that, when cured, is about 10–30 mils thick. After 5 days' curing at about 65° F., a hard, smooth, impervious patch-coat is obtained, or curing can be accelerated by steam or dry heat as noted at the end of Example 1.

The quantity of Components A and B set forth in Example 2 are those found to be convenient for small patching jobs where only a few ounces of material are to be used at one time. Depending upon the amount required for immediate use, the total quantity per batch may be increased up to a gallon or more, while using the suggested proportions of ingredients. Since the materials react rapidly, the amount to be mixed should not exceed that required during two to four hours.

In addition to its utility as a patching material, the material is excellent for various coatings where brush-application is required or preferred. It has been applied to wet steel with excellent results; since the water on the steel is absorbed by the material during curing, no rust is formed and excellent adhesion is obtained.

Various changes and modifications within the scope of this invention may occur to a man skilled in the art. Other epoxy resins, other curing agents, various compatible pigments to produce various colors, and varying amounts of the materials employed may be used within the scope of this invention.

We claim:
1. A blush-resistant moisture-sensitive curing agent for coatings of glycidyl polyethers of polyhydric alcohols or phenols comprising as the essential curing ingredient one part by weight of an alkyl ketone polyketimine of a polyamine capable of releasing a curing amount of amine on exposure to moisture adducted under moisture-free conditions at about 160° to 170° F. with about ½ to ⅔ part by weight of said polyether.

2. The curing agent of claim 1 wherein the polyketimine is methyl isobutyl ketone polyketimine of diethylene triamine.

3. A blush-resistant moisture-sensitive curing agent for coatings of glycidyl polyethers of polyhydric alcohols or phenols comprising as the essential curing ingredient an alkyl ketone polyketimine of a polyamine capable of releasing a curing amount of amine upon exposure to moist air reacted in the absence of moisture at about 160° to 170° F. with about 6 parts by weight of said polyether per 10 parts of said polyketimine.

4. A blush-resistant epoxy resin type coating composition adapted to be applied to metal surfaces and set thereon by chemical reaction with moisture comprising as essential ingredients a glycidyl polyether of polyhydric alcohols or phenols and a curing amount of an adduct of about 10 parts of an alkyl ketone polyketimine of a polyamine adapted to release an amine upon contact with moisture formed by reacting at about 160° to 170° F. under water-free conditions said polyketimine and about 6 parts of polyether.

5. A blush-resistant epoxy resin type coating composition adapted to be spread upon metal surfaces promptly after completely constituted to set thereon by chemical reaction comprising as essential ingredients a glycidyl polyether of polyhydric alcohols or phenols, a curing amount of an adduct of about 10 parts of an alkyl ketone polyketimine of a polyamine adapted to release an amine upon contact with moisture reacted at about 160° to 170° F. in the absence of moisture with about 6 parts of said polyether and an amount of water sufficient to release said amine from said polyketamine.

6. The method of preparing an epoxy resin type coating mixture having restrained setting characteristics until applied and having resistance to blushing, comprising heating in the absence of moisture at a temperature between about 160° F. and about 170° F. about 10 parts by weight of an alkyl ketone polyketimine of a polyamine which releases an amine on contact with moisture and about 6 parts of a glycidyl polyether of polyhydric alcohols or phenols until reaction ceases, then cooling the reacted mixture and mixing with about 40 parts of a said polyether.

7. The method of claim 6 wherein immediately before application to the metal surface, water is added to the mixture in quantity sufficient to release substantially all the amine from the polyketimine.

8. The method of claim 7 in which the mixture is applied by spraying and the water is added by injecting from about two to eight times the theoretical water required into the atomizing air used for spraying.

9. The method of claim 7 in which from one to two times the theoretical quantity of water required to release the amine is blended into the liquid mixture and the resulting composition is applied by spreading.

10. In the formation of an epoxy resin coating upon base surfaces by spraying thereon a mixture of a glycidyl polyether of polyhydric alcohols or phenols and an alkyl ketone polyketimine of a polyamine which upon exposure to moisture releases an amine in sufficient quantity to cure said polyether to form an epoxy resin coating, the method of reducing the blushing tendency of the coating which comprises partially reacting said polyketimine and said polyether prior to spraying.

11. In the formation of an epoxy resin coating upon base surfaces by spraying thereon a mixture of a glycidyl polyether of a polyhydric alcohol or phenol and an alkyl ketone polyketimine of a polyamine which upon exposure to moisture releases an amine in sufficient quantity to cure said polyether to form an epoxy resin coating, the method of reducing the blushing tendency of the coating which comprises reacting said polyketimine with about one-seventh of said polyether at a temperature between about 160° F. and 170° F., cooling the thus reacted mixture and adding it to the remaining polyether before spraying.

12. In the formation of an epoxy resin coating upon base surfaces by brushing thereon a mixture of a glycidyl polyether of a polyhydric alcohol or phenol and an alkyl ketone polyketimine of a polyamine which upon exposure to moisture releases an amine in sufficient quantity to cure said polyether to form an epoxy resin coating, the method of reducing the blushing tendency of the coating which comprises reacting said polyketimine with about one-seventh of said polyether at a temperature between 160° F. and 170° F., cooling the thus reacted mixture and, just prior to use, thoroughly mixing therewith the remaining polyether and 100% to 200% of the theoretical quantity of water required to react with said polyketimine.

References Cited

UNITED STATES PATENTS 2,651,589    9/1953    Shokal et al. _____ 260—47

FOREIGN PATENTS 1,277,643    10/1961    France.

OTHER REFERENCES

Lee et al.: "Epoxy Resins," p. 15 relied on, McGraw-Hill Books Co., Inc., New York, 1957.

WILLIAM H. SHORT, *Primary Examiner.*

T. D. KERWIN, *Assistant Examiner.*